United States Patent
Venkataraghavan et al.

(10) Patent No.: US 10,972,516 B1
(45) Date of Patent: Apr. 6, 2021

(54) SYSTEM, METHOD, AND COMPUTER PROGRAM FOR PROBABILISTIC ESTIMATION AND PREVENTION OF MUTING OCCURRENCES IN VOICE OVER LTE (VOLTE)

(71) Applicant: Amdocs Development Limited, Limassol (CY)

(72) Inventors: Krishnan Venkataraghavan, Chennai (IN); Ram Kumar Sharma, Rajasthan (IN); Sagar Tayal, Ambala (IN)

(73) Assignee: AMDOCS DEVELOPMENT LIMITED, Limassol (CY)

(*) Notice: Subject to any disclaimer, the term of this patent is extended or adjusted under 35 U.S.C. 154(b) by 265 days.

(21) Appl. No.: 16/112,515

(22) Filed: Aug. 24, 2018

(51) Int. Cl.
*H04L 29/06* (2006.01)

(52) U.S. Cl.
CPC ...... *H04L 65/1083* (2013.01); *H04L 65/1016* (2013.01); *H04L 65/608* (2013.01)

(58) Field of Classification Search
USPC ................. 370/252, 259, 338, 349
See application file for complete search history.

(56) References Cited

U.S. PATENT DOCUMENTS

| | | | | |
|---|---|---|---|---|
| 2006/0056346 A1* | 3/2006 | Vadgama | .......... | H04W 72/1278 370/329 |
| 2008/0247361 A1* | 10/2008 | Jung | ............ | H04W 36/12 370/331 |
| 2012/0170761 A1 | 7/2012 | Ozawa | | |
| 2017/0251031 A1 | 8/2017 | Lehesaari et al. | | |
| 2017/0353598 A1* | 12/2017 | Cho | .......... | H04L 43/0817 |
| 2018/0192303 A1* | 7/2018 | Hui | .......... | H04W 24/04 |
| 2019/0215679 A1* | 7/2019 | Rahman | .......... | H04W 8/12 |

FOREIGN PATENT DOCUMENTS

| | | |
|---|---|---|
| CN | 107517487 A | 12/2017 |
| JP | 2017204840 A | 11/2017 |

\* cited by examiner

*Primary Examiner* — Alpus Hsu
*Assistant Examiner* — Hooman Houshmand
(74) *Attorney, Agent, or Firm* — Zilka-Kotab, P.C.

(57) ABSTRACT

A system, method, and computer program product are provided for probabilistic estimation and prevention of muting occurrence in VoLTE. In operation, a system estimates a muting probability associated with a current state of a newly initiated call between calling user equipment (UE) and called UE by computing a muting contribution per interface between the calling UE and the called UE utilizing a muting probability estimation algorithm. Further, the system determines possible corrective actions to be performed specific to the current call state utilizing a correlation algorithm for prevention of muting occurrences.

12 Claims, 13 Drawing Sheets

300

```
The RTP header has the following format:

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|            contributing source (CSRC) identifiers             |
|                             ....                              |
+-+-+-+-+-+-+-+-+-+-+-+-+-+-+-+-+-+-+-+-+-+-+-+-+-+-+-+-+-+-+-+-+
```

FIGURE 3

SYSTEM, METHOD, AND COMPUTER PROGRAM FOR PROBABILISTIC ESTIMATION AND PREVENTION OF MUTING OCCURRENCES IN VOICE OVER LTE (VOLTE)

FIELD OF THE INVENTION

The present invention relates to call muting in communication networks and, more particularly, to probabilistic estimation and prevention of muting occurrences in VoLTE.

BACKGROUND

VoLTE is a voice call service delivered over an Internet Protocol (IP) via an LTE access by utilizing an Internet Multimedia Subsystem (IMS) network. In a communication network such as VoLTE, muting is one of the most commonly encountered problems. Conventionally, resolution of this issue is based on analysis of data collected by network operators. The data collected may be stored for the analysis.

In one example scenario, the network operators may provide an appropriate resolution based on user complaints about muting problems in an area or multiple areas within a network provided by the network operators. The appropriate resolution may comprise parameter tuning, feature implementation, and device-specific troubleshooting, such as a software upgrade, etc. However, in such an approach, the appropriate resolution is provided only after occurrence of the muting problem and may solve the problem for a period of time. In such scenario, user perception may also be highly impaired. Consequently, other issues, such as higher inter-operator churn rates may be affected that directly impact revenue of the network operators.

Hence, there is a need to reduce packet loss and muting problems so as to improve user experience. More specifically, there is a need to proactively estimate muting that may occur at different levels such as, interfaces, nodes or user equipment (UE). Moreover, there is a need to provide corrective actions or configurations to prevent user perception impairment (from a muting occurrence).

There is thus a need for addressing these and/or other issues.

SUMMARY

A system, method, and computer program product are provided for probabilistic estimation and prevention of muting occurrences in VoLTE. In operation, a system estimates a muting probability associated with a current state of a newly initiated call between calling user equipment (UE) and called UE by computing a muting contribution per interface between the calling UE and the called UE utilizing a muting probability estimation algorithm. Further, the system determines possible corrective actions to be performed specific to the current call state utilizing a correlation algorithm for prevention of muting occurrences.

BRIEF DESCRIPTION OF THE DRAWINGS

FIG. 3 shows an example illustrating Real-Time Protocol (RTP) header fields, in accordance with one embodiment.

DETAILED DESCRIPTION

Figure 1:
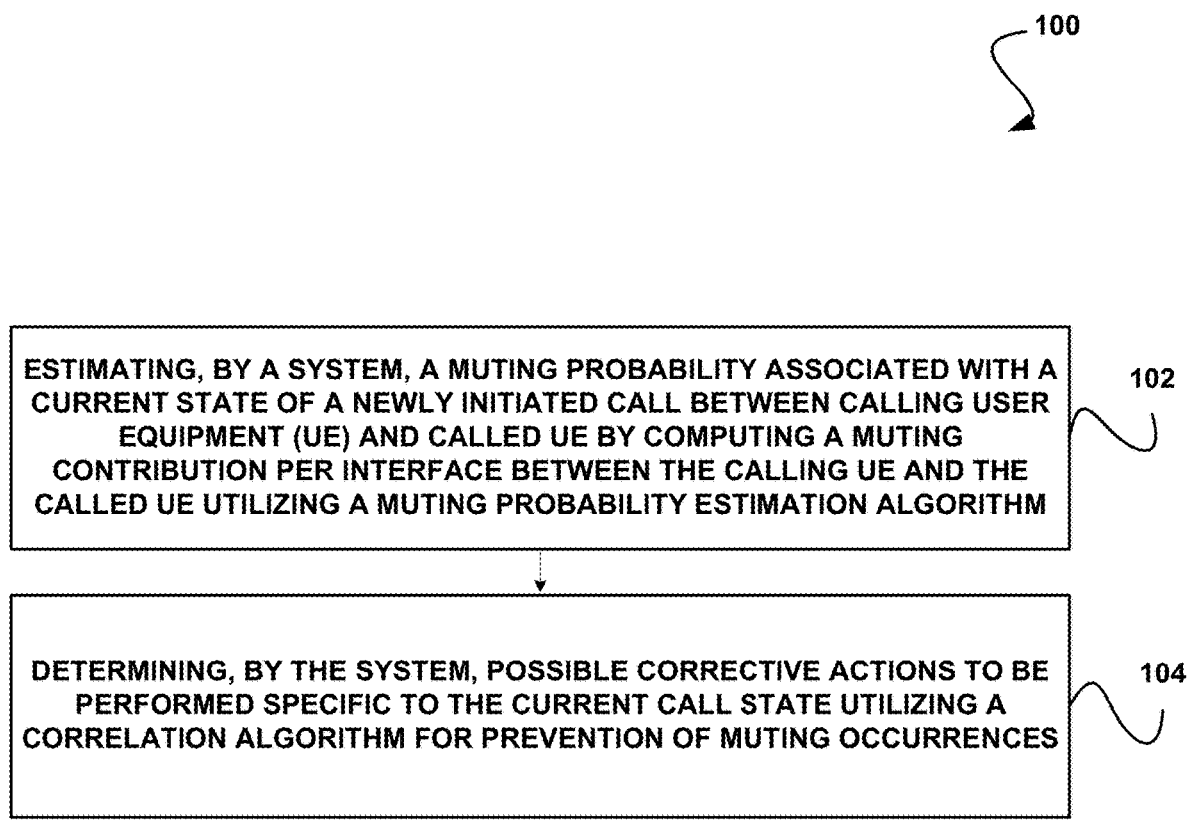
FIG. 1 illustrates a method for probabilistic estimation and prevention of muting occurrences in VoLTE, in accordance with one embodiment.

FIG. 1 illustrates a method 100 for probabilistic estimation and prevention of muting occurrences in VoLTE, in accordance with one embodiment.

In operation, a system estimates a muting probability associated with a current state of a newly initiated call between calling user equipment (UE) and called UE by computing a muting contribution per interface between the calling UE and the called UE utilizing a muting probability estimation algorithm. See operation 102. The newly initiated call may include a VoLTE to VoLTE call, a VoLTE to CS call, a VoLTE to PSTN call, or various other VoLTE calls, etc. The calling UE and/or the called UE may include any device capable of making and/or receiving a VoLTE call, such as a mobile phone, tablet computer, computer, etc.

The current state of the call may be associated with one or more of a location state, a time state, a device state, a mobility state, and/or a resource availability state, etc.

Computing the muting contribution per interface utilizing the muting probability estimation algorithm may include a variety of computations, estimations, and/or steps, as explained in further detail in the context of the subsequent figures. As an example, computing the muting contribution per interface between the calling UE and the called UE may include estimating a hop level muting contribution. The system may maintain at least one parameter that measures a number of Real-Time Protocol (RTP) packets lost per hop.

As another example, computing the muting contribution per interface between the calling UE and the called UE may include estimating a number of active payloads and a number of inactive payloads. Additionally, in one embodiment, computing the muting contribution per interface between the calling UE and the called UE may include calculating an interface level weighted composite muting score between the calling UE and the called UE. In one embodiment, an interface level muting contribution and associated current state may be periodically collected by the system in a data lake based on a determined muting granularity.

Further, the system determines possible corrective actions to be performed specific to the current call state utilizing a correlation algorithm for prevention of muting occurrences. See operation 104. The possible corrective actions may include any action for preventing muting occurrences in the call. For example, the corrective action may include device level delisting. This may include identifying user equipment (e.g. the calling or the called UE, etc.) as rogue user equipment. Other examples of corrective actions may include parameter tuning, feature implementation, and device-specific troubleshooting, such as a software upgrade, etc.

Thus, the method 100 may be implemented by the system for probabilistic estimation and prevention of muting occurrences in VoLTE. The system may implement the methodology to estimate interface level muting contribution from a calling UE to a called UE and vice-versa (considering RTP streams in downlink (DL) and uplink (UL)) based on a configurable parameter (e.g. mutingduration, etc.). The system may also implement a methodology for performing corrective actions by the network to resolve the muting based on a correlation algorithm that identifies the closest possible cause of the muting to determine the best resolution proactively. For a newly initiated call, the muting probability may be estimated with respect to a current state of the calling UE and the called UE, where the current state may include location state, time state, device state, mobility state (calling UE and called UE), resource availability state such as % PDCCH blocking, % PRB utilization (QCI specific) in the source and target cell(s) corresponding to the calling UE and the called UE (where applicable), codec allocation for the call, carriers of cell(s) (calling and called UE), where the UEs are connected, etc.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
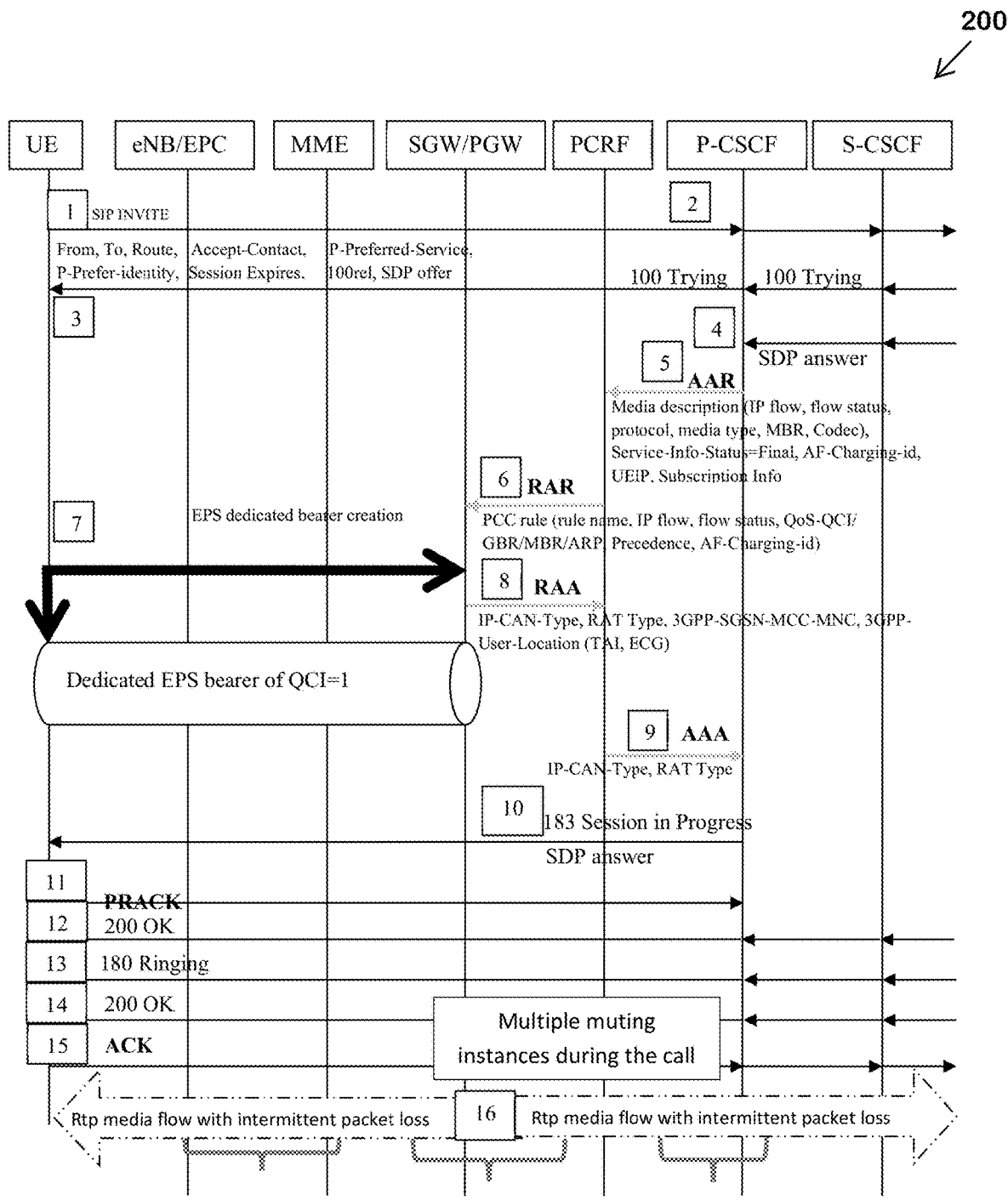
FIG. 2 shows a system flow diagram illustrating an occurrence of muting instances in a mobile originating VoLTE to VoLTE call flow, in accordance with one embodiment.

FIG. 2 shows a system flow diagram 200 illustrating an occurrence of muting instances in a mobile originating VoLTE to VoLTE call flow, in accordance with one embodiment. As an option, the diagram 200 may be implemented in the context of the details of the previous figure and/or any subsequent figure(s). Of course, however, the diagram 200 may be implemented in the context of any desired environment. Further, the aforementioned definitions may equally apply to the description below.

In FIG. 2, establishment of a VoLTE call is described so as to understand occurrence of muting problem in VoLTE. Generally, making a call in VoLTE includes user equipment (UE) sending a Session Initiation Protocol (SIP) request. It may be noted that SIP servers such as, Proxy-Call Session Control Function and Serving-Call Session Control Function help in sending and receiving SIP signaling packets respectively. P-CSCF receives SIP packets from the UE and forwards the packets to S-CSCF. A call originating from one UE is connected to another UE (that may be in same or different network) via gateways, such as Serving Gateway (SGW) or Packet Data Network (PDN) gateway PGW. Here, the UE that initiates the call may be referred as the "calling UE" or "Mobile Originating (MO) UE" and the other UE receiving call request may be referred as the "called UE" or "Mobile Terminating (MT) UE".

It may be noted that an eNodeB is connected to the gateway through a Mobility Management Entity (MME). The MME helps in determining the appropriate gateway for a call. The control decision and flow control are decided by a Policy Control and Charging Rule Function (PCRF). The eNodeB and MME communicates with each other through air-interfaces such as S1AP interfaces.

Referring to FIG. 2, following are the detailed steps involved in a mobile originating VoLTE to VoLTE call flow in an existing system.

Initially, a calling UE or MO UE initiates a SIP INVITE request and sends the request to P-CSCF. See Step 1. It may be understood here that the P-CSCF is discovered during an IP Multimedia Subsystem registration procedure.

The P-CSCF then forwards the SIP INVITE request to S-CSCF that had been identified based on UE capability during the IMS registration. See Step 2.

The S-CSCF routes the SIP INVITE request to a Telecommunication Application Server (TAS) to invoke VoLTE supplementary services. The S-CSCF then acknowledges the invite with a 100-Trying response indicating that the call setup is in progress. See Step 3.

The called UE or MT UE returns a Session Description Protocol (SDP) answer in a 183-session progress message. The SDP answer is sent by the S-CSCF to the P-CSCF. The SDP answer contains information such as codecs and other media information to negotiate during the call setup. See Step 4.

The P-CSCF analyses the SDP in the SDP answer and sends an Authorization and Authentication request (AAR) to a Policy and Charging Rules Function (PCRF) node. See Step 5.

The PCRF initiates a Re-Auth-Request (RAR) to the PGW to initiate creation of a dedicated bearer for voice (QCI1). See Step 6.

The PGW triggers EPS bearer creation for QCI by the create session request procedure, followed by an RRC connection reconfiguration from the eNB to UE. See Step 7.

The PCRF responds to the P-CSCF with an Authorization and Authentication Answer (AAA) upon successful RAA procedure from the PGW. See Step 8.

The 183 session progress message is delivered to the UE over the QCI 1 bearer created in the above procedure. See Step 9.

The calling UE generates a Provisional Response Acknowledgement (PRACK) towards the called UE. See Step 10.

The called UE then with 200 OK provides an acknowledgement for a successful reception of the PRACK. See Step 11.

The called UE is alerted and sends a 180-ringing message towards the calling UE. At this point, the calling party hears the ringtone. See Step 12.

The subsequent 200 OK response signal indicates that the called party has answered the call. See Step 13.

The ACK acknowledges the establishment of media such as a voice session on both uplink (UL) and downlink (DL). See Step 14.

At this point, the VoLTE call is successfully established. See Step 15.

After successful establishment of the QCI1 bearer and RTP packet flow on the bearer, muting instances may be observed. Generally, a muting instance corresponds to an N consecutive RTP sequence numbers lost, where one RTP sequence number corresponds to a duration of 20 ms. The number of consecutive RTP sequence numbers, where N is a configurable parameter in the Apache ML framework.

FIG. 3 shows an example 300 illustrating Real-Time Protocol (RTP) header fields, in accordance with one embodiment. As an option, the example 300 may be implemented in the context of the details of the previous figures and/or any subsequent figure(s). Of course, however, the example 300 may be implemented in the context of any desired environment. Further, the aforementioned definitions may equally apply to the description below.

With respect to differentiating an inactive payload from an active payload, the payload type field (7-bit field) in the RTP header is used to distinguish between an active and inactive payload. (SID).

An SID occurrence or an inactive payload is estimated based on the occurrence of an RTP payload where payload type (PT=13). The average silence duration due to SID is estimated based on number of SID occurrences (PT=13) *SIDperiodicity (in ms).

Hence, the total VoLTE call duration per unit time is estimated as: #(Active Payloads)*20 ms+#(inactive-payloads)*SIDperiodicity (in ms).

Figure 4:
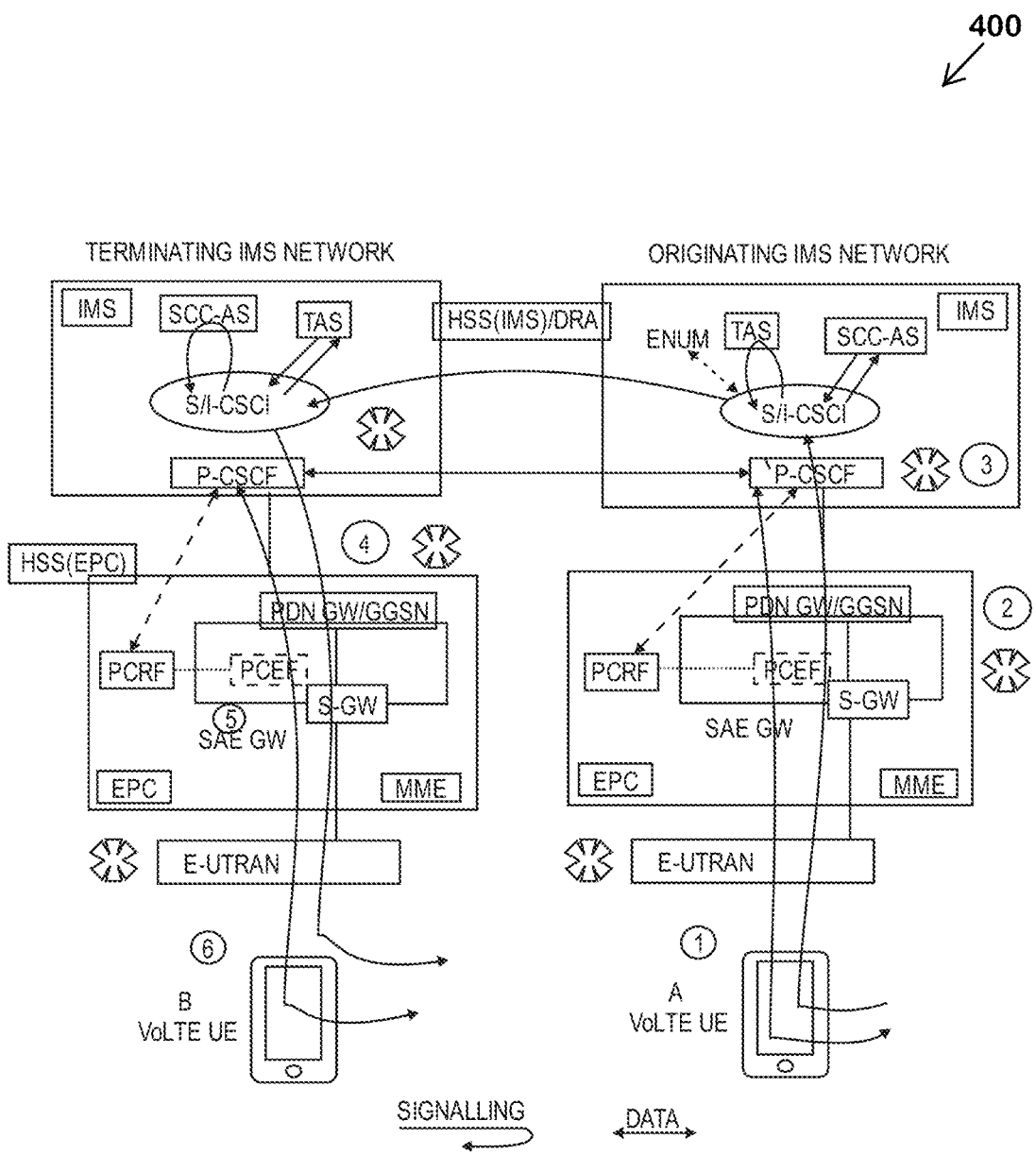
FIG. 4 shows a system flow diagram illustrating a VoLTE-MO to VoLTE-MT call flow—RTP Signaling, in accordance with one embodiment.

FIG. 4 shows a system flow diagram 400 illustrating a VoLTE-MO to VoLTE-MT call flow—RTP Signaling, in accordance with one embodiment. As an option, the system flow diagram 400 may be implemented in the context of the details of the previous figures and/or any subsequent figure(s). Of course, however, the system flow diagram 400 may be implemented in the context of any desired environment. Further, the aforementioned definitions may equally apply to the description below.

As described herein, Algorithm 1 refers to an algorithm for interface level packet loss estimation. The muting instances may be triggered due to packet loss at interface level.

A new parameter "mutingduration" is introduced to determine interface level muting contribution. The interface level muting contribution in a VoLTE-VoLTE call is explained below. However, it may be noted that, the technique is not limited to only VOLTE to VOLTE call scenarios.

The muting instances in a VoLTE-VoLTE call may be triggered due to packet loss on the interfaces, not limited to: 1) packet loss in Radio Access Network (RAN) happening on the Uu Interface between UEs (MO, MT) and corresponding cell of the serving eNB on a particular carrier frequency; packet losses in the Evolved Packet Core (EPC) between eNB and S-GW/PGW(s); packet loss between the EPC and IMS nodes such as PGW and P-CSCF; packet loss at the IMS core such as P-CSCF (MO UE) to P-CSCF (MT UE) (where applicable) and vice-versa.

The data lake (e.g. crowd sourced) that collects sample muting contribution is explained in the following with reference to FIG. 5.

In one embodiment, a crowd sourced Hadoop data lake, enabled with Apache Spark framework for Machine Learning abilities may be utilized to collect, store, compute and determine a next action to initiate (where applicable) based on the analyzed data set.

Figure 5:
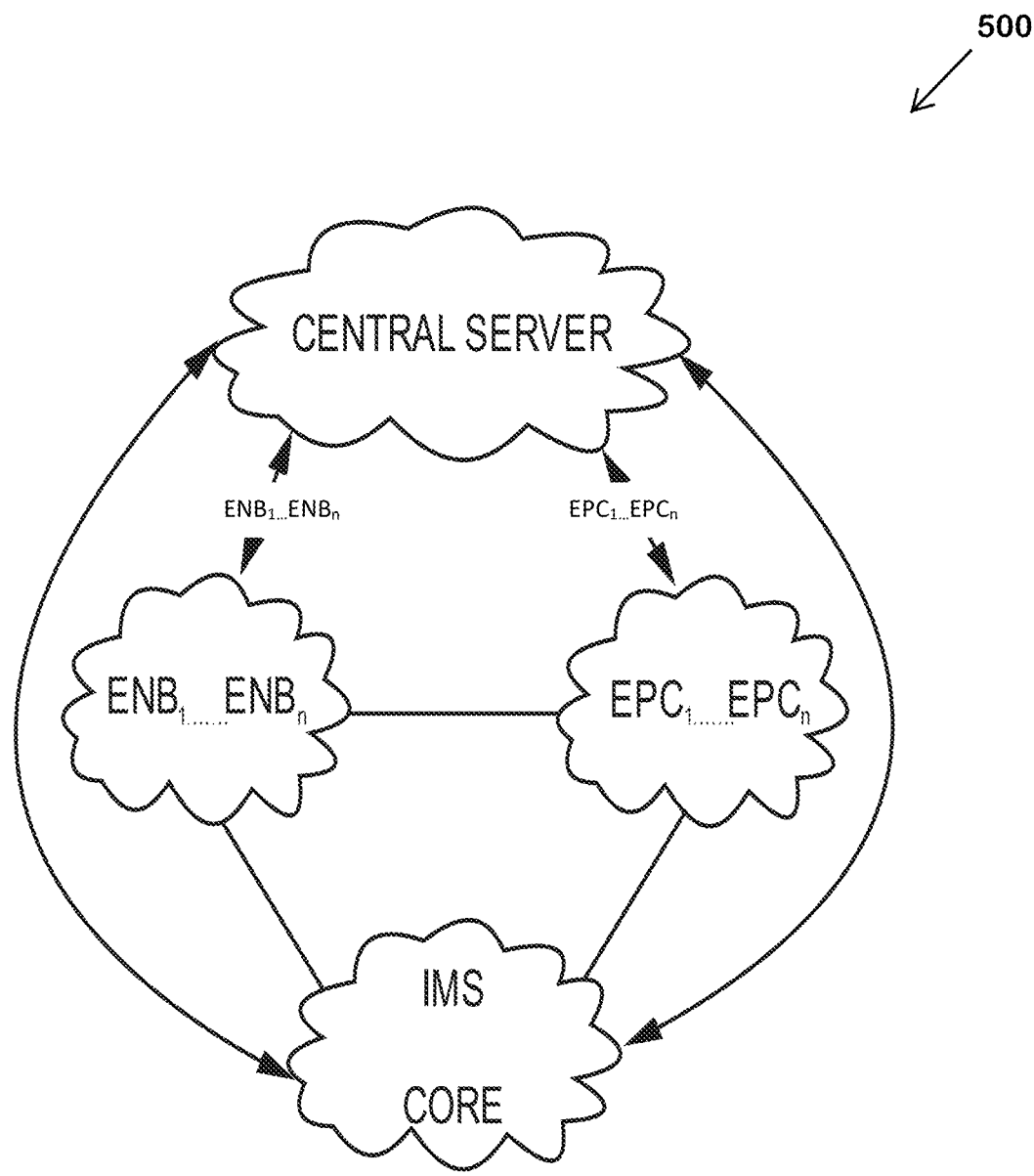
FIG. 5 shows a system flow diagram illustrating a data lake collecting samples of muting and RTP packet losses per interface, in accordance with one embodiment.

FIG. 5 shows a system flow diagram 500 illustrating a data lake collecting samples of muting and RTP packet losses per interface, in accordance with one embodiment. As an option, the system flow diagram 500 may be implemented in the context of the details of the previous figures and/or any subsequent figure(s). Of course, however, the system flow diagram 500 may be implemented in the context of any desired environment. Further, the aforementioned definitions may equally apply to the description below.

The data sources associated with FIG. 5 include: CM Data—RAN, EPC and IMS; PM Data—RAN, EPC and IMS; FM Data—RAN, EPC and IMS; and Probe/CTR Data—RAN, EPC and IMS interfaces.

A new parameter, "mincallrecords" is introduced and represents the minimum data set required for spark machine learning frame work in the data lake (CM/PM/FM/Probe and CTR) and will be unique per interface.

For each call, samples of muting contribution and absolute RTP packet losses per interface are reported per node (RAN/EPC/IMS). The call may include VoLTE-VoLTE, VoLTE-CS, VoLTE-PSTN, etc. At each unique VoLTE—VoLTE or VoLTE-CS or VoLTE—PSTN where, callcount<mincallrecords (Unique per node—interface) at the data lake, the data lake may capture the following, not limited to: Location Context (Lc), where location context includes information such as, site, cell, carrier frequency within a cell, and bandwidth of the carrier of the cell of both MO and MT UEs; Time Context (Tc), where time context includes time information such as Week/Day/Hour/Minute/Second/Millisecond of call origination and termination with respect to MO and MT UEs based on configurable muting-granularity; Device Context (Dc), where device context includes device information such as Device Model/Manufacturer/Chipset information/Device Software release, etc.; Resource Availability and Codecs Allocation per call statistics of the available channel and resources including PDCCH/PDSCH PRB utilization, PDCCH Blocking, etc. on the respective RAN nodes; RTP Packet Loss including interface level RTP packet loss; Muting Initiation time, including Average Mute Start time with respect to call start time; Average call duration estimated for both normal and abnormal calls; Active Payload, including the payload containing data; In-Active Payload including a payload with Comfort Noise/SID; and RTPSqnfirst, RTPSqnlast, including first and last RTP sequence no per node.

Figure 6:
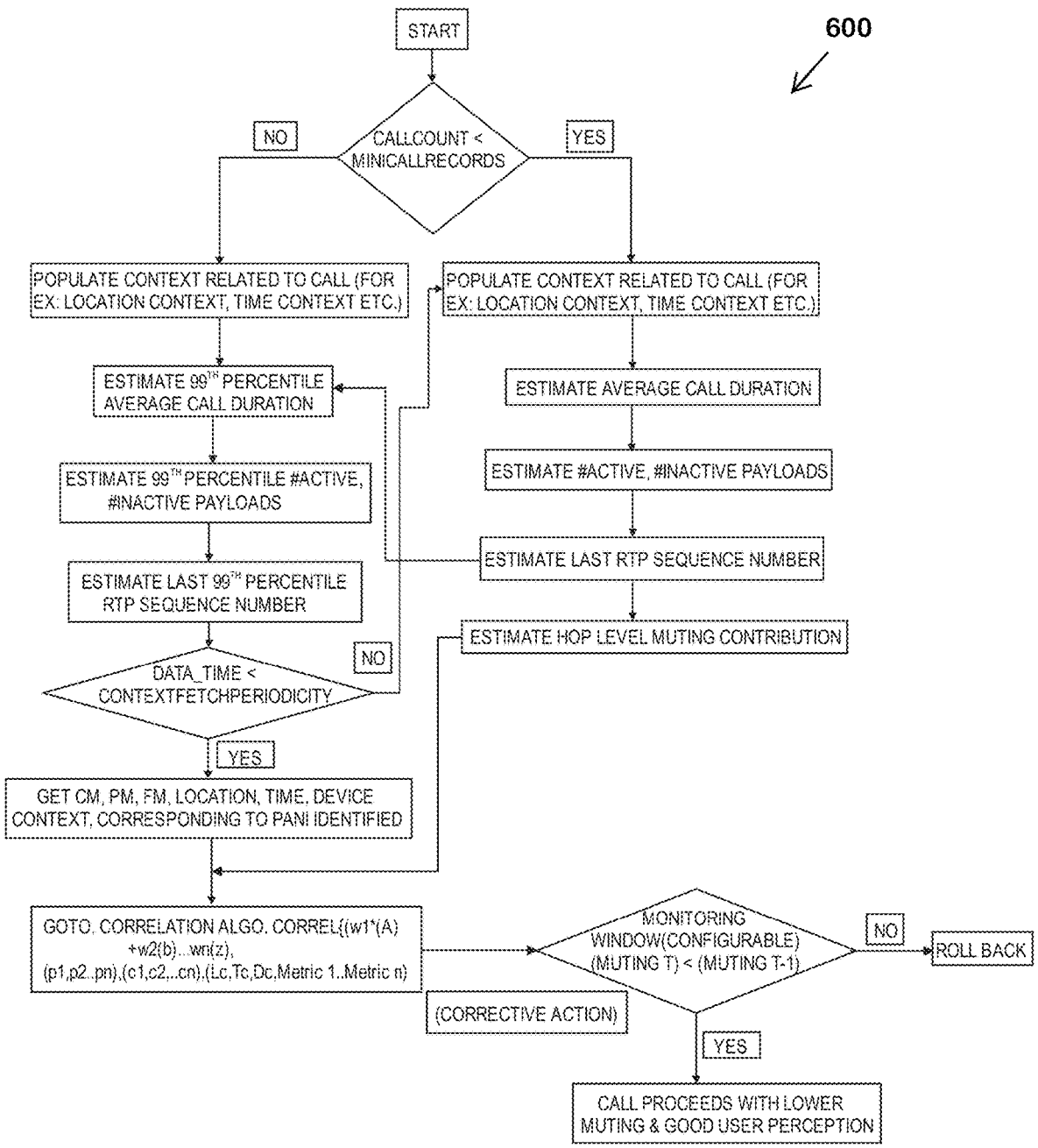
FIG. 6 shows a method illustrating an overall end to end algorithm for change trigger and rollback for estimating average call duration per node at a data lake, in accordance with one embodiment.

FIG. 6 shows a method 600 illustrating an overall end to end algorithm for change trigger and rollback for estimating average call duration per node at a data lake, in accordance with one embodiment. As an option, the method 600 may be implemented in the context of the details of the previous figures and/or any subsequent figure(s). Of course, however, the method 600 may be implemented in the context of any desired environment. Further, the aforementioned definitions may equally apply to the description below.

Algorithm 2 refers to an algorithm for estimating average call duration per node at a data lake, as described below.

Step 1: The time interval between bearer setup (create bearer response) and bearer deletion (delete bearer response) at the S-GW is estimated for each QCI 1 bearer.

Step 2: Primary Access network information (PANI) from the invite corresponding to the RTP session of the bearer is used to determine the node that the call sample belongs.

Step 3: For each QCI 1 bearer deleted (normal+abnormal), the data lake is updated with the call duration and the node corresponding to call. The spark ML framework is configured to detect mincallrecords per node prior to feeding the correlation algorithm for preventive triggers of muting.

Step 4: Averagecalldurationnode n=AvgaTqcilbearerdel)−(Tqcilbearerstp)) per unique PANI.

Step 5: $99^{th}$ percentile of Averagecallduration, #Activepayload, #Inactivepayload is estimated for each node n corresponding to bearer setup and deletion (normal+abnormal).

Algorithm 3 refers to an algorithm for estimating expected RTP Sequence numbers per call at a data lake and is described below.

Step 1: For each call I, where callcount<mincallrecords, average duration is estimated as specified in steps 1 to 5 above (Algorithm 2).

Step 2: if callcount>, mincallrecords, then Step 2a: For each node n, get Averagecallduration99thpct, #Activepayload99thpct, #Inactivepayload99thpct which is $99^{th}$percentile equivalent value of Averagecallduration, #Activepayload, #Inactivepayload respectively.

Step 3: The expected RTPSequecnenumbercalli on node n is estimated as: RTPSequecnenumbercalli= (Averagecalldurationnoden99thpct)/ (#Activepayloadnoden99thpct, *20)+ (#Inactivepayloadnoden99thpct*SIDperiodicity (in ms).).

Algorithm 4 refers to an algorithm for estimating RTP Sequence number range per call per node at a data lake and is described below.

For each call 'i' on node n—Step 1: Set RTPSqnfirst=0; Step 2: Set RTPSqnlast=(0+RTPSequecnenumbercalli).

Figure 7:
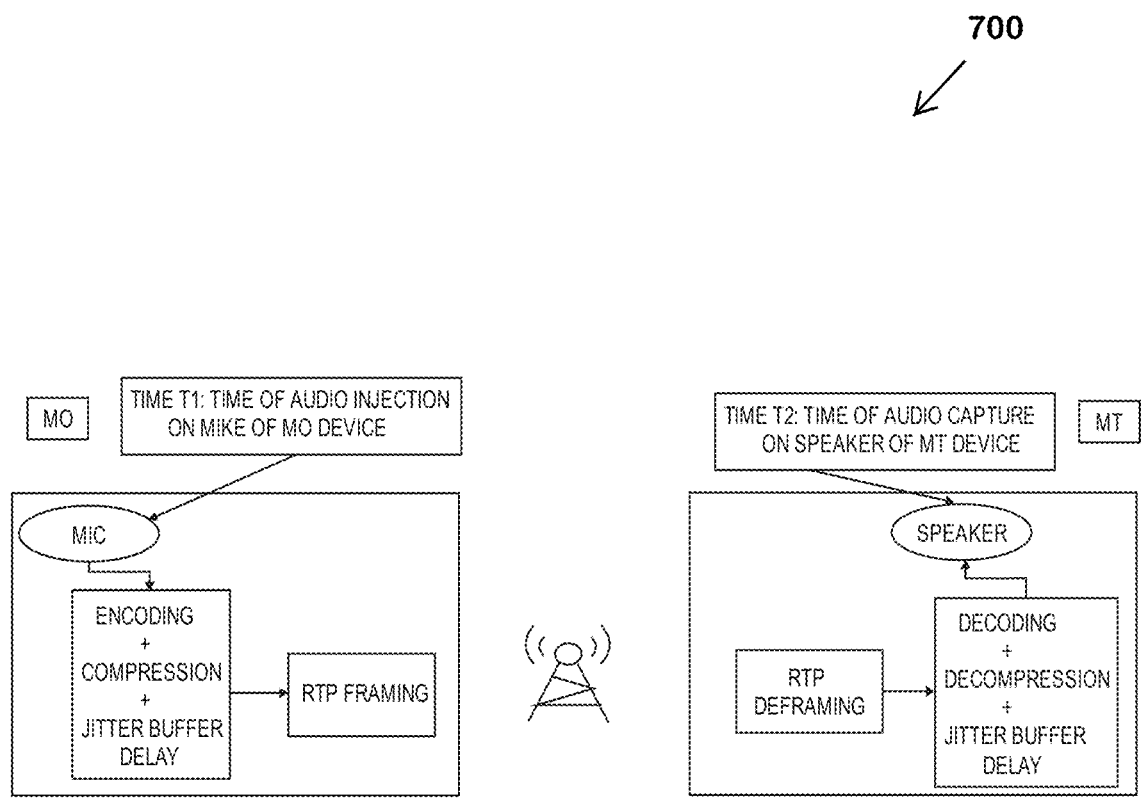
FIG. 7 shows a system flow diagram illustrating RTP framing and de-framing at the MO UE and MT UE, in accordance with one embodiment.

FIG. 7 shows a system flow diagram 700 illustrating RTP framing and de-framing at the MO UE and MT UE, in accordance with one embodiment. As an option, the system flow diagram 700 may be implemented in the context of the details of the previous figures and/or any subsequent figure(s). Of course, however, the system flow diagram 700 may be implemented in the context of any desired environment. Further, the aforementioned definitions may equally apply to the description below.

Algorithm 5 refers to an algorithm for estimating the hop level muting contribution at a data lake, and is described below.

The number of RTP packet loss at a given interface can be determined based on the steps described in the following, at a given granularity such as {mutinggranularity configurable}, per unique call, per IMEI (MO/MT) and per HOP.

Step 1: RTP Packets lost Hop(i) (aggregated up to configured mutingduration). RTPlosthop(i) (i.e. interface between source and target nodes)=(sum (RTP packet transmitted by source node)–sum (RTP packets received by Target node)).

Step 1a: For each unique interface, depending on the call type (VoLTE-VoLTE, VoLTE-CS or VoLTE to PSTN) the first and last RTP are estimated based on RTPSqnfirst and RTPSqnlast respectively.

Step 2: Muting Contribution of this interface/node determined as: Muting Contribution hop(i)=(RTPlosthop(i))/ (mutingduration)/((#Activepayload*20)+ (#InActivepayload*SIDperiodicity (in ms).))*100. Step 2a: Active and inactive are estimated depending on value of payload type (PT).

Step 3: Since there can be multiple carriers per source cell, the muting ratio is estimated per carrier frequency on Uu interface. So, RTPlosthop(Uuf1)=x/RTPlosthop(Uu); RTPlosthop(Uuf2)=y/RTPlosthop(Uu); where, f1 and f2 are carrier frequency per source cell; x,y corresponds to lost RTP packets on Uu interface corresponding to f1 and f2 carrier frequency layers respectively.

Step 4: RTPlosthop(i) is calculated for each hop(i) where a hop can be any of but not limited to interfaces 1 to 4 in FIG. 4.

Figure 8:
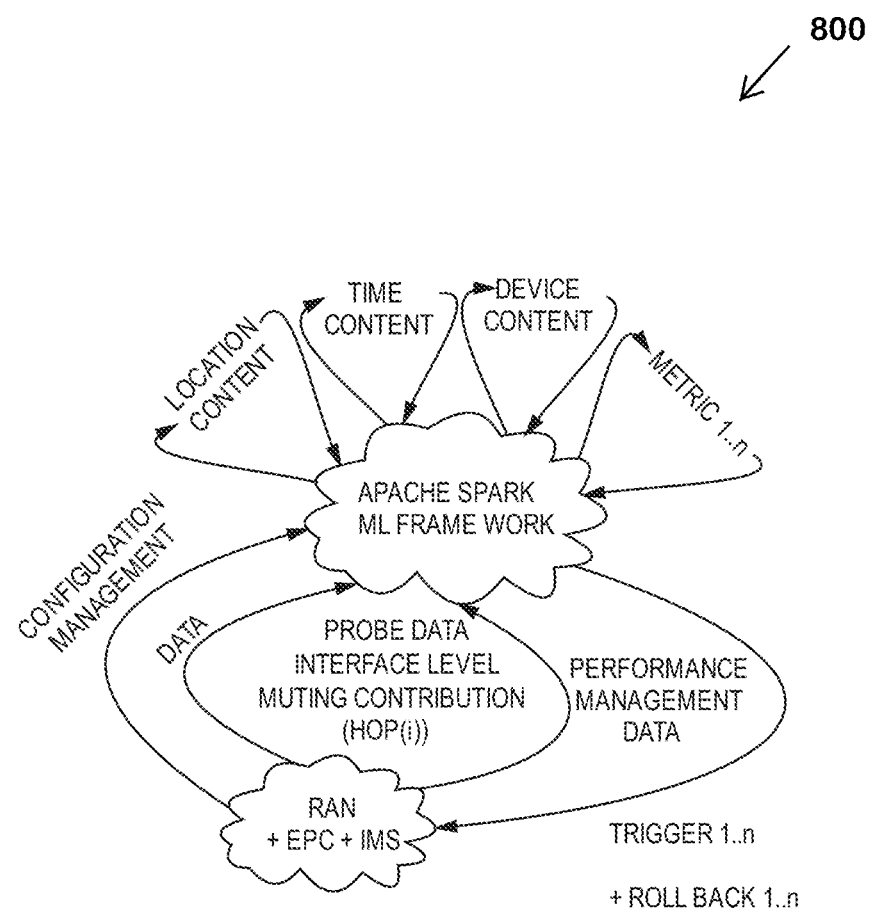
FIG. 8 shows a system flow diagram illustrating input sources to an Apache Spark ML Framework, in accordance with one embodiment.

FIG. 8 shows a system flow diagram 800 illustrating input sources to the Apache Spark ML Framework, in accordance with one embodiment. As an option, the system flow diagram 800 may be implemented in the context of the details of the previous figures and/or any subsequent figure(s). Of course, however, the system flow diagram 800 may be implemented in the context of any desired environment. Further, the aforementioned definitions may equally apply to the description below.

Algorithm 6 refers to a correlation algorithm for change trigger and rollback, and is described below.

Step 1: The data lake is updated by each unique node/ interface (RAN+EPC+IMS) (with configured probe) for each unique VoLTE call including details of RTP sequence numbers, Call ID, PANI, etc.

Step 2: RTP packet loss and muting contribution is estimated per hop by the spark ML framework based on algorithm mentioned in Algorithm 5.

Step 3: Node level association of the above records is performed based on algorithm mentioned in Algorithm 2 (Algorithm for estimating average call duration per node at a data lake).

Step 4: Additional inputs such as the location context, device context and time context are estimated by the ML framework based on inputs received in Step 1.

Step 5: The ML determines which node(s) the CM feed is to be read based on output of Step 3.

Step 6: The ML also takes the PM/FM feeds of the node(s) based on Step 3.

Step 7: The data set {PM/CM/FM & Probe/CTR Data} is used to provide the decision of change trigger or rollback based on output of the Correlation Algorithm at the data lake, provided callcount>mincallrecords.

Step 7a: The output of the Apache ML framework is dependent on the interface(s) contributing to the muting and estimated based on the algorithm for interface level muting ratio.

Step 7b: In case multiple interfaces are contributing to the muting, a relativeweight (w) is estimated to determine the dominant contributor (RAN/EPC/IMS) to the muting.

A composite muting score is estimated as follows: $w1*(a)+w2(b) \ldots wn(z)$; where, $w1, w2 \ldots wn$ are interface level weights $\{w1+w2 \ldots wn=1\}$; and $a, b \ldots n$ are interface level RTP Packet losses.

A correlation function is used to determine the major contribution of packet loss as:
correl$\{(w1*(a)+w2(b) \ldots wn(z), (p1, p2 \ldots pn), (c1, c2, \ldots cn), (Lc, Tc, Dc, Metric1 \ldots Metricn))$; where, $w1, w2 \ldots wn$ are interface level weights $\{w1+w2 \ldots wn=1\}$; $a, b \ldots n$ are interface level RTP Packet losses; $p1, p2 \ldots pn$ are PM metric $1 \ldots n$ on node (Source/Target); $c1, c2 \ldots cn$ are CM metric $1 \ldots n$ on node (Source/Target); Lc=Location context; Tc=Time context; Dc=Device Context; Ex. Metric 1=#Active payload; and Ex. Metric 2=#InActive payload.

Based on output of the correlation function the appropriate change trigger/optional roll-back action is determined and sent to appropriate node(s) (RAN/EPC/IMS).

One use case example may include poor radio condition on a Uu interface corresponding to frequency layer f1 of calling node resulting in high RTP packet loss and muting.

Figure 9:
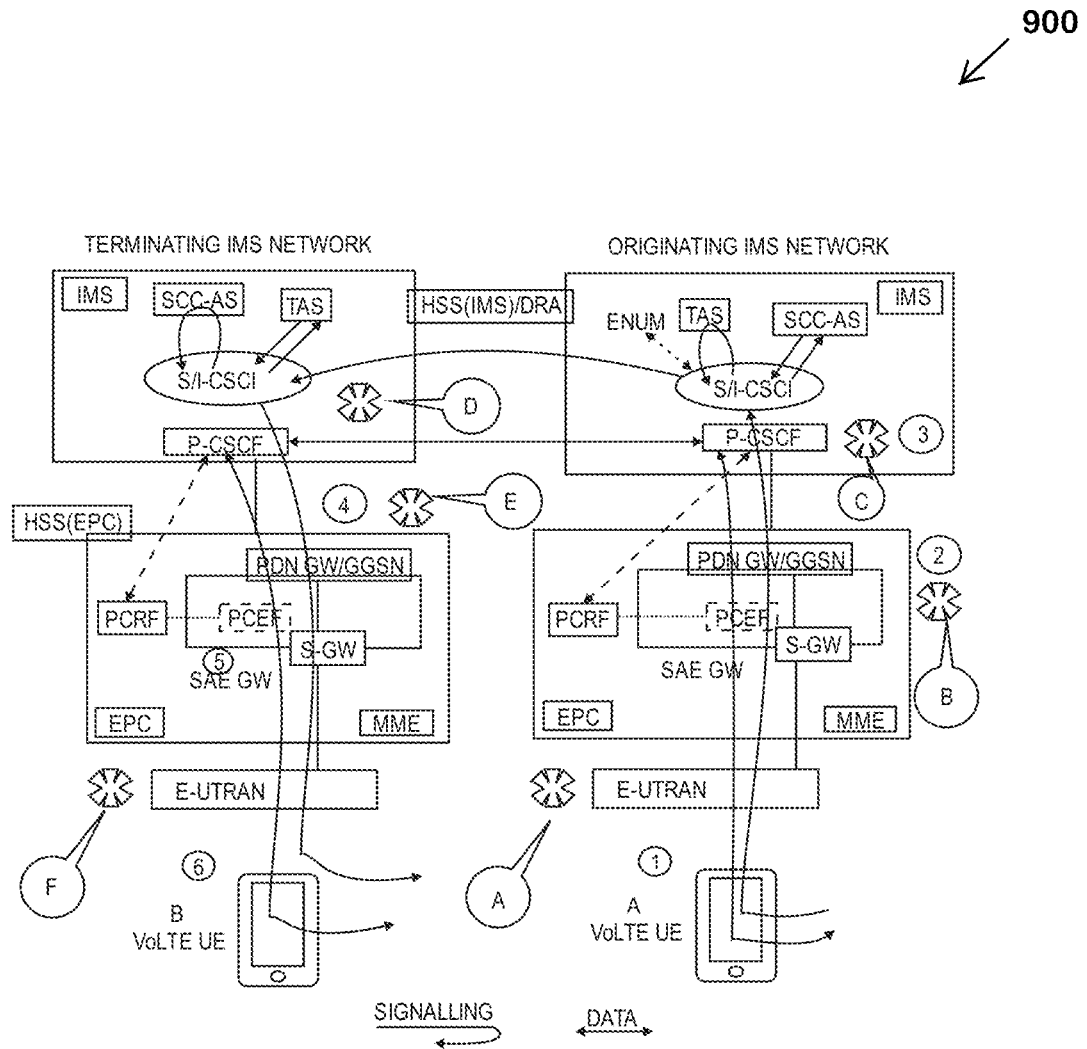
FIG. 9 shows a system flow diagram illustrating interface level packet loss in VoLTE end to end call flow, in accordance with one embodiment.

FIG. 9 shows a system flow diagram 900 illustrating interface level Packet loss in VoLTE End to end call flow, in accordance with one embodiment. As an option, the system flow diagram 900 may be implemented in the context of the details of the previous figures and/or any subsequent kfigure(s). Of course, however, the system flow diagram 900 may be implemented in the context of any desired environment. Further, the aforementioned definitions may equally apply to the description below.

Step 1: VoLTE call setup sequence from Step 1 to 15 in FIG. 2 remains the same for current call.

Step 2: It is assumed that callcount in the node corresponding to call in Step 1>mincallrecords.

Step 3: A, B, C, D, E and F denote packet losses in respective interfaces from RAN to the core where A>B>C>D>E>F.

Step 4: Metrics considered in the PM/CM correlation algorithm corresponding to packet loss at f1 is given below.

Step 5: RTP Packet loss due to Poor radio conditions on Uu.

Figure 10A:
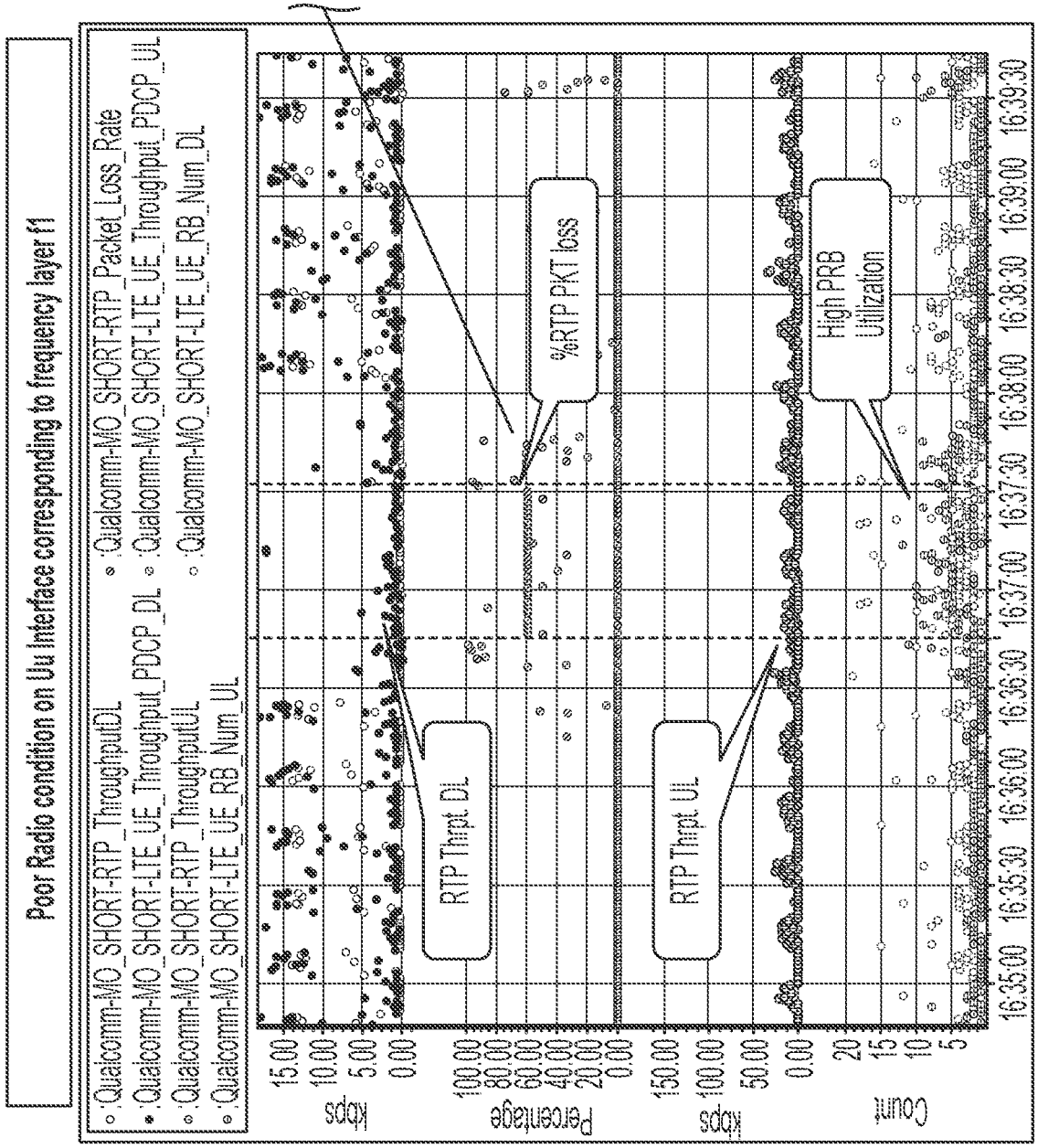
FIGS. 10A-B show a system flow diagram illustrating RTP packet loss due to poor radio conditions, in accordance with one embodiment.
Figure 10B:
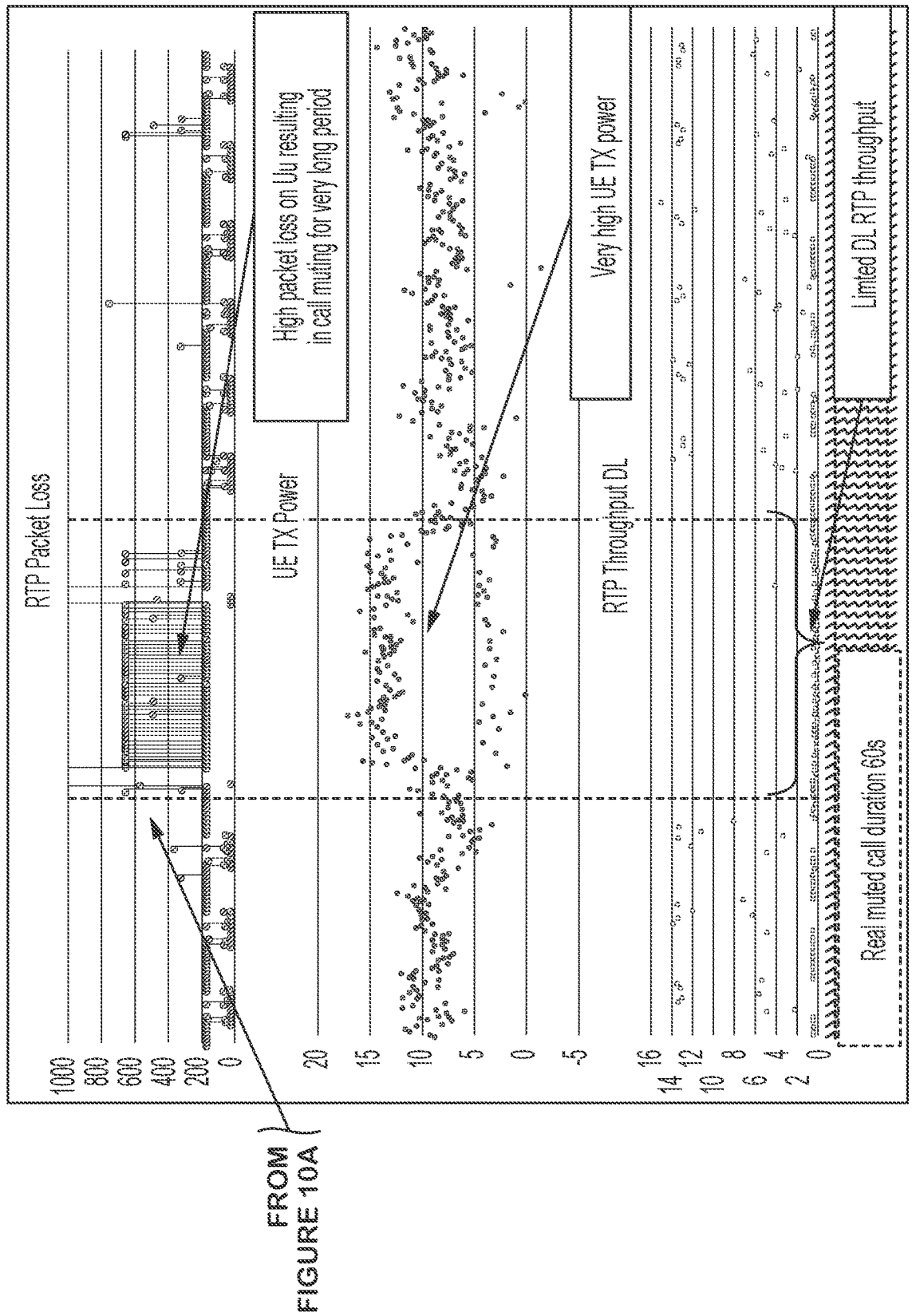

FIGS. 10A-B show a system flow diagram 1000 illustrating RTP Packet loss due to poor radio conditions on Uu, in accordance with one embodiment. As an option, the system flow diagram 1000 may be implemented in the context of the details of the previous figures and/or any subsequent figure(s). Of course, however, the system flow diagram 1000 may be implemented in the context of any desired environment. Further, the aforementioned definitions may equally apply to the description below.

Step 6: High RTP Packet loss on Uu, High UE Transmit (Tx) power, High Physical Resource Block (PRB) Utilization results in muting duration of 60 s for example.

Step 7: corral $(w_1*(A)+w_2(B) \ldots w_n(F)$, (UE TX PWR, RTP packet loss rate, . . . PRB; Utilization (DL/UL), $(c_1, c_2, \ldots, c_n)$, (Lc, Tc, Dc, $Metric_1 \ldots Metric_n$)); where, $w_1, w_2, \ldots, w_n$ are interface level weights $\{w_1+w_2+\ldots+w_n=1\}$; A, B, F are interface level RTP Packet losses, where A>B>C>D>E>F; $p_1, p_2, \ldots, p_n$ are Performance Measurement, PM $metric_{1 \ldots n}$ on node (Source/Target); $c_1, c_2, \ldots, c_n$ are Configuration Management, CM $metric_{1 \ldots n}$ on node (Source/Target); Lc=Location context; Tc=Time context; Dc=Device Context; Ex. $Metric_1$=#Active payload; Ex. $Metric_2$=#In-Active payload.

Step 8: Output of correlation algorithm indicates high RTP packet loss due to poor radio condition on f1 of Uu interface.

Step 9: Coverage enhancement related parameter set tuned at the eNB by the Apache Spark ML Framework as an example in this instance.

Thus, the techniques described herein may be implemented by a system to proactively identify a muting probability for a newly initiated call based on interface level muting contribution, including, in one embodiment, estimation of an interface level weighted composite muting score from the originating UE to the terminating UE. The system may also perform execution of corrective actions based on identified problem areas (muting contribution such as interfaces/nodes/UEs, including rogue UEs, etc.) based on a correlation algorithm. Furthermore, the system may utilize the new configurable parameters described herein, such as "mutingduration", "callmutinggranularityfactor", "callmutingexchanageperiodicity", "Contextfetchtype", "Thiscontext" and new counters such as "packetlosscounter" that measure a number of RTP packets lost per hop.

Figure 11:
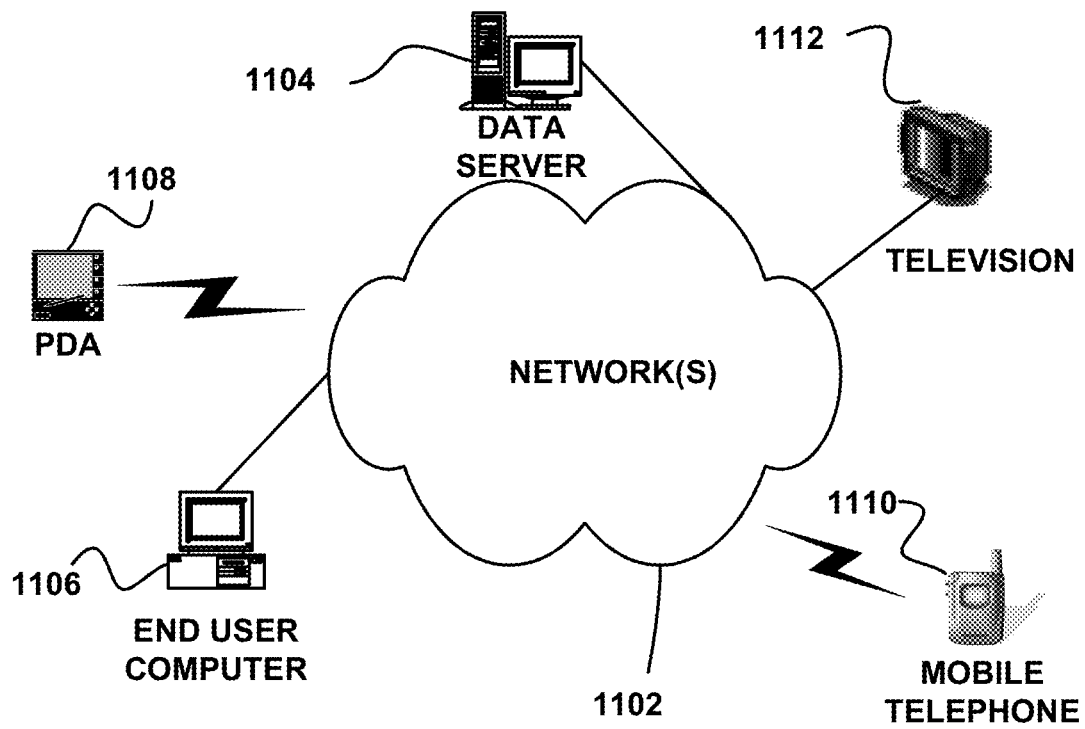
FIG. 11 illustrates a network architecture, in accordance with one possible embodiment.

FIG. 11 illustrates a network architecture 1100, in accordance with one possible embodiment. As shown, at least one network 1102 is provided. In the context of the present network architecture 1100, the network 1102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1102 may be provided.

Coupled to the network 1102 is a plurality of devices. For example, a server computer 1104 and an end user computer 1106 may be coupled to the network 1102 for communication purposes. Such end user computer 1106 may include a desktop computer, lap-top computer, and/or any other type of logic. Still yet, various other devices may be coupled to the network 1102 including a personal digital assistant (PDA) device 1108, a mobile phone device 1110, a television 1112, etc.

Figure 12:
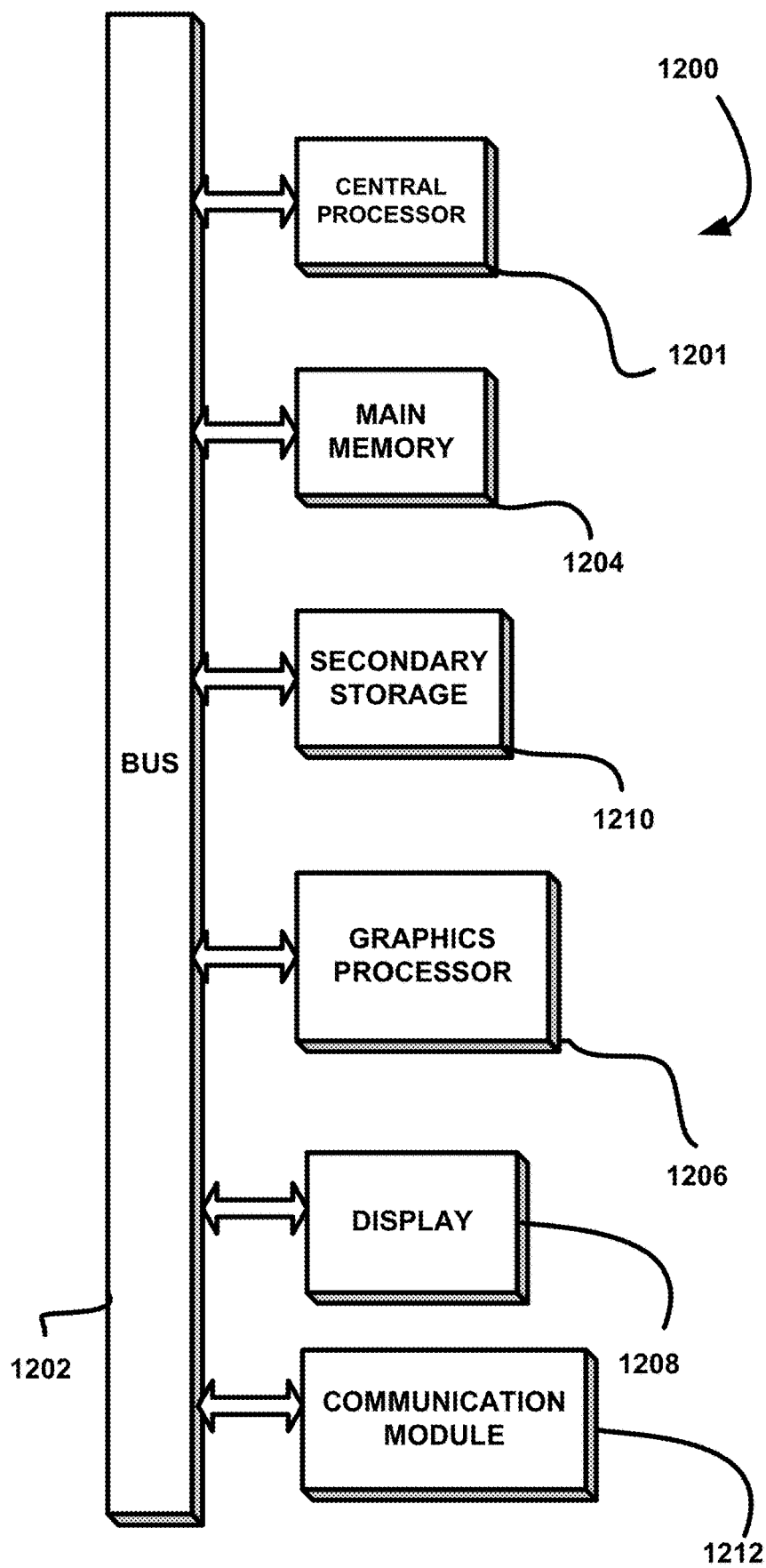
FIG. 12 illustrates an exemplary system, in accordance with one embodiment.

FIG. 12 illustrates an exemplary system 1200, in accordance with one embodiment. As an option, the system 1200 may be implemented in the context of any of the devices of the network architecture 1100 of FIG. 11. Of course, the system 1200 may be implemented in any desired environment.

As shown, a system 1200 is provided including at least one central processor 1201 which is connected to a communication bus 1202. The system 1200 also includes main memory 1204 [e.g. random access memory (RAM), etc.]. The system 1200 also includes a graphics processor 1206 and a display 1208.

The system 1200 may also include a secondary storage 1210. The secondary storage 1210 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1204, the secondary storage 1210, and/or any other memory, for that matter. Such computer programs, when executed, enable the system 1200 to perform various functions (as set forth above, for example). Memory 1204, storage 1210 and/or any other storage are possible examples of non-transitory computer-readable media.

The system 1200 may also include one or more communication modules 1212. The communication module 1212 may be operable to facilitate communication between the system 1200 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   compiling a data lake for a communication network, including for each interface of a plurality of node interfaces existing in the communication network:
      identifying a defined minimum number of call records to be included in a data set to be processed by a machine learning framework,
      generating the data set by collecting up to the defined minimum number of call records, each of the call records associated with a call between a calling user equipment (UE) and a called UE;
   processing the data lake by the machine learning framework to:
      determine information including a location context of each call, a time context of each call, a device context of each call, interface level Real-Time Protocol (RTP) packet loss per interface for each call, muting contribution per interface for each call, average mute start time with respect to call start time, average call duration, and expected RTP sequence numbers for each call, and
      initiate a change trigger or rollback for one of the interfaces of the plurality of node interfaces that is determined to be contributing to muting,
   wherein when multiple of the interfaces of the plurality of node interfaces are determined to be contributing to the muting, the change trigger or the rollback is initiated for a dominant contributing interface of the multiple interfaces.

2. The method of claim 1, wherein computing the muting contribution per interface for each call includes estimating a hop level muting contribution.

3. The method of claim 1, wherein computing the muting contribution per interface for each call includes estimating a number of active payloads and a number of inactive payloads.

4. The method of claim 1, wherein the change trigger includes device level delisting.

5. The method of claim 1, wherein when multiple of the interfaces of the plurality of node interfaces are determined to be contributing to the muting, the dominant contributing interface of the multiple interfaces is determined by:
   estimating a relative weight for each interface of the multiple of the interfaces,
   for each interface of the multiple of the interfaces, multiplying the relative weight by the RTP Packet loss determined for the interface to obtain a weighted RTP Packet loss for the interface, and
   using a correlation function on the weighted RTP Packet losses obtained for the multiple of the interfaces.

6. The method of claim 5, wherein the correlation function further considers:
   a performance metric per calling UE and called UE,
   a configuration metric per calling UE and called UE,
   a location context,
   a time context, and
   a device context.

7. A computer program product embodied on a non-transitory computer readable medium, comprising computer code for:
   compiling a data lake for a communication network, including for each interface of a plurality of node interfaces existing in the communication network:
      identifying a defined minimum number of call records to be included in a data set to be processed by a machine learning framework,
      generating the data set by collecting up to the defined minimum number of call records, each of the call records associated with a call between a calling user equipment (UE) and a called UE;
   processing the data lake by the machine learning framework to:
      determine information including a location context of each call, a time context of each call, a device context of each call, interface level Real-Time Protocol (RTP) packet loss per interface for each call, muting contribution per interface for each call, average mute start time with respect to call start time, average call duration, and expected RTP sequence numbers for each call, and
      initiate a change trigger or rollback for one of the interfaces of the plurality of node interfaces that is determined to be contributing to muting,
      wherein when multiple of the interfaces of the plurality of node interfaces are determined to be contributing to the muting, the change trigger or the rollback is initiated for a dominant contributing interface of the multiple interfaces.

8. The computer program product of claim 7, wherein computing the muting contribution per interface for each call includes estimating a hop level muting contribution.

9. The computer program product of claim 7, wherein computing the muting contribution per interface for each call includes estimating a number of active payloads and a number of inactive payloads.

10. The computer program product of claim 7, wherein the change trigger includes device level delisting.

11. A system, comprising one or more processors, operated for:
   compiling a data lake for a communication network, including for each interface of a plurality of node interfaces existing in the communication network:
      identifying a defined minimum number of call records to be included in a data set to be processed by a machine learning framework,
      generating the data set by collecting up to the defined minimum number of call records, each of the call records associated with a call between a calling user equipment (UE) and a called UE;
   processing the data lake by the machine learning framework to:
      determine information including a location context of each call, a time context of each call, a device context of each call, interface level Real-Time Protocol (RTP) packet loss per interface for each call, muting contribution per interface for each call, average mute start time with respect to call start time, average call duration, and expected RTP sequence numbers for each call, and
      initiate a change trigger or rollback for one of the interfaces of the plurality of node interfaces that is determined to be contributing to muting,
      wherein when multiple of the interfaces of the plurality of node interfaces are determined to be contributing to the muting, the change trigger or the rollback is initiated for a dominant contributing interface of the multiple interfaces.

12. The system of claim 11, wherein computing the muting contribution per interface for each call includes estimating a hop level muting contribution.

* * * * *